United States Patent Office 3,511,866
Patented May 12, 1970

3,511,866
ISOCYANATOALKYL HALO SILANES AND METHODS FOR MAKING SAME
Enrico J. Pepe, Amawalk, N.Y., assignor to Union Carbide Corporation, a corporation of New York
No Drawing. Continuation-in-part of application Ser. No. 307,003, Sept. 6, 1963. This application Feb. 7, 1968, Ser. No. 706,701
Int. Cl. C07f 7/10
U.S. Cl. 260—448.2         5 Claims

ABSTRACT OF THE DISCLOSURE

This invention describes a novel isocyanato silanes of the formula $$O=C=NCH_2CH_2CH_2\underset{(CH_3)_n}{SiX_{3-n}}$$

wherein X is halogen such as chlorine, fluorine and bromine by the reaction of allyl isocyanate with $$\underset{(CH_3)_n}{HSiX_{3-n}}$$

and $n$ is 0, 1 or 2. The novel compounds are used to form polyurethane resin coating compositions.

---

This application is a continuation-in-part of my copending application Ser. No. 307,003 filed Sept. 6, 1963, now abandoned, which is assigned to the assignee of this invention.

There is described in U.S. Pat. No. 3,170,891, patented Feb. 23, 1965 (hereinafter called the "Speier patent"), a process for producing isocyanato substituted siloxanes and alkoxy silanes. This process involves the addition of an alkenyl isocyanate to an alkoxy silane hydride or siloxane hydride in the presence of a platinum catalyst. The silane isocyanate monomer is not directly convertible to a siloxane polymer possessing isocyanate groups because hydrolysis of the silane would result in the loss of the isocyanate groups.

The Speier patent discloses silanes of the formula $$O=C=NR\underset{R_{a'}}{Si(OR''')_{3-a}}$$

wherein R''' is alkyl, aryl, aralkyl or alkaryl. This compound is described in the Speier patent as being formed by the reaction of an alkenyl isocyanate with an alkoxy silane hydride. However, when this reaction is carried out with allyl isocyanate in accordance with the disclosure of the Speier patent essentially little reaction occurs and very little useable isocyanatopropyl-alkoxy-silane is obtained.

There is shown in Example 1 below the reaction between allyl isocyanate and alkoxysilane. The best potential yield obtainable of the product was 4.7 weight percent. In addition, this monomer would be difficult to isolate, if it exists in the mixture, in a relatively pure state because of the nature of the reaction mixture. The Speier patent does not describe a practical method for making gamma-isocyanatopropyl silane.

There is described herein a method for making gamma-isocyanatopropyl silanes in exceptionally good yields. Moreover, such product is isolatable.

The products of this invention are characterized by the following formula:

$$O=C=NCH_2CH_2CH_2\underset{(CH_3)_n}{SiX_{3-n}}$$

wherein X is halogen selected from the group consisting of chlorine, fluorine and bromine, and $n$ is 0, 1 or 2.

This silane is produced by the reaction of allyl isocyanate with a trihalo silane of the following formula:

$$\underset{(CH_3)_n}{HSiX_{3-n}}$$

wherein X has the meaning given above. This reaction is effected in the most conventional manner and involves the use of a catalytic amount of catalyst which favors the addition of the allyl isocyanate at the site of the hydrogen of the silane. The reaction can be achieved in the presence of a ionic or free radical addition catalyst and such other addition catalysts as platinum, platinum salts and chloro platinic acid. The use of the platinum type catalyst is preferred since it does not create undesirable by-product formation as would be obtained from the decomposition of a free radical catalyst such as a peroxide. The reaction proceeds exothermically starting at room temperature. A wide temperature range may bt employed, such as a range starting as low as −10° C. to as high as 200° C. The preferred temperature range is about 20° C. to about 150° C. From the resulting reaction mixture, the isocyanatopropyl(trihalo) silane can be obtained by conventional distillation techniques. Solvents may be used providing that they contain no active hydrogen if it is desired to make the reaction components compatible or if recrystallization of the end product is desired.

The most useful of the silane isocyanates is the trihydrolyzable specie, that is, the silane which contains 3 halogen groups. It has significant utility as a coupling agent for fiber glass and other inorganic substrates. The isocyanato groups are readily reactive with compounds which contain active hydrogen such as glycols, amines, amides, mercaptans, and the like, to form resinous compositions such as polyurethane resin coating compositions.

All of the isocyanates described above are most useful in the manufacture of gamma-aminopropylsiloxanes. By immersing the isocyanatopropyl halo silanes in a caustic solution such as aqueous sodium or potassium hydroxide, a hydrolyzate is formed in which the isocyanate has been converted to free amino. If the isocyanato silanes are added to a strong acid solution such as an aqueous hydrochloric acid solution, the isocyanate is converted to the corresponding amine hydrochloride.

EXAMPLE 1

Into a 200 cubic centimeter, 3-necked flask fitted with a magnetic stirrer, thermometer and addition funnel were added 73.3 grams (0.6 mole) of trimethoxysilane. There was then added to the flask 0.033 gram of chloroplatinic acid dissolved in two cubic centimeters of dimethyl ether of ethylene glycol (dimethyl Cellosolve). The flask was then heated to 70° C. and 46.5 grams of distilled allyl isocyanate was added over a period of 10 minutes. No exotherm was observed during this addition, after which the reaction was heated to reflux at 86° C. and reflux was continued for 19 hours, during which time the temperature increased to 91° C. The reaction was then cooled and the unreacted starting materials were removed under vacuum leaving 33.8 grams of crude reaction products remaining. This represented 33 percent of the theoretical weight (102.7 grams).

The 33.8 grams of crude reaction products were then distilled under reduced pressure through a 1 foot Vigreaux column to give 20.2 grams of a single distillable fraction, indicated below as number 1, which boiled at 42–51° C. at 0.5 millimeter of mercury. The balance of the material consisted of a non-distillable residue. Fraction number 1, with a $N_D^{25}=1.4265$, was analyzed for isocyanate content by reaction with excess of standard diisopropylamine. An isocyanato equivalent of 855 (theory being 205.3) was obtained indicating that Fraction number 1 contained approximately 25 percent free isocyanate. The fraction was then sampled by vapor phase chromatography (VPC) and infra-red spectroscopy (IR) to identify the number of components and their structures. It was determined by this analysis that only 4.7 percent of the product yield had characteristics consistent with the structure of gamma-isocyanatopropyl(trimethoxy) silane but such silane could only be isolated, if isolatable, by extremely costly and difficult procedures.

EXAMPLE 2

Into a 500 milliliter 3-necked flask, fitted with mechanical stirrer, condenser, thermometer, dropping funnel and heating mantle was charged 68 grams (0.5 mole) of HSiCl$_3$ and 10 parts per million (.00089 gram) of Pt(H$_2$PtCl$_6$) in EtOH. A total of 21 grams, 0.25 mole of allyl isocyanate was added quickly to the flask and 140 parts per million more of Pt was added. After one hour at reflux, an additional 150 parts per million Pt was added and over 1 hour the reflux temperature rose from 46 to 49° C. Vacuum stripping to remove unreacted starting material produced 40 grams (73 mole percent) of $\gamma$-OCN(CH$_2$)$_3$SiCl$_3$, most of which distilled water white at from 48° C./0.6 millimeter mercury 65° C./2.4 millimeters mercury ($n_{25}$ 1.4620).

*Analysis.*—Calc'd for C$_4$H$_6$SiCl$_3$NO (percent): C, 22.0; H, 2.8; Si, 12.9; Cl, 48.7; N, 6.4. C, 21.9; H, 2.6; Si, 13.1; Cl, 48.5; N, 6.5.

EXAMPLE 3

Into a 1-liter, 3-necked flask fitted with thermometer, dropping funnel, stirrer, water condenser and mantle was charged 460.1 grams (4.0 moles) of MeSiHCl$_2$ plus 0.196 gram (100 parts per million) of H$_2$PtCl$_6$·6H$_2$O dissolved in 15 milliliters of dimethyl Cellosolve. At 42° C., 274 grams (3.3 moles) of allyl isocyanate was added dropwise over a period of about 1 hour, with the reaction temperature rising exothermically throughout to 84° C. The colorless mixture was stirred an additional 30 minutes at 85° C. Distillation through a 1-foot Vigreaux column gave 622 grams of $\gamma$-OCN(CH$_2$)$_3$ SiMeCl$_2$ in 96 molepercent conversion of 99.0 percent purity.

Boiling point—110–114° C./~ 15 millimeters, $n^{25}$ 1.4599, hydrolyzable Cl—199.3 (198.1 calcd.).

*Analysis.*—Calc'd for C$_5$H$_9$SiN Cl$_2$O (percent): C, 30.3; H, 4.6; Si, 14.2; N, 7.1; Cl, 35.8. C, 30.6; H, 4.5; Si, 14.2; N, 6.9; Cl, 36.2.

EXAMPLE 4

When the procedure of Example 2 is repeated except that the trichloro silane is replaced with trifluoro silane, the resulting product is gamma-isocyanatopropylbromosilane.

EXAMPLE 5

When the procedure of Example 2 is repeated except that the trichlorosilane is replaced with tribromosilane the resulting product is gamma - isocyanatopropylbromosilane.

EXAMPLE 6

Into a 100 milliliter 3-necked flask equipped with thermometer, magnetic stirrer and Dry-Ice condenser was charged 14.2 grams (0.15 mole) Me$_2$SiHCl and 12.5 grams (0.15 mole) of CH$_2$=CHCH$_2$NCO. To this agitated mixture, under dry N$_2$, there was added .03 Pt, as H$_2$PtCl$_6$·6H$_2$O in dimethyl Cellosolve. The system was heated to reflux temperatures (57° C. initial) for a period of 4–6 hours. After this period of time the reflux temperature rose to 68° C. Vacuum distillation produced 11.0 grams (42 mole percent) of clear water white material of the formula $\gamma$-OCN(CH$_2$)$_3$Si(CH$_3$)$_2$Cl having the following characteristics: Boiling point: 94–98° C./14 millimeters Hg, $n_D^{25}$=1.4465, NE 190.9 (177.7 calcd.).

*Analysis.*—Calc'd for C$_6$H$_{12}$SiNOCl (percent): O, 40.6; H, 6.8; Si, 15.8; Cl, 20.0; N, 7.9. O, 40.1; H, 7.0; Si, 16.0; Cl, 20.0; N, 7.8.

The following illustrates the usefulness of isocyanatoorganosilanes to produce the corresponding aminoorganosilicones via simple hydrolysis. The method would be especially useful for the preparation of

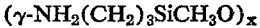
($\gamma$-NH$_2$(CH$_2$)$_3$SiCH$_3$O)$_x$ (which is not readily available) via hydrolysis of readily available OCN(CH$_2$)$_3$SiMeCl$_2$.

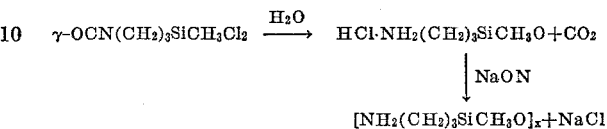

wherein $x$ is a positive number having a value of at least 2.

EXAMPLE 7

Into a 1 liter 3 necked flask outfitted with stirrer and dropping funnel was charged 500 ml. of water and 168 grams (0.85 mole) of $\gamma$-OCN(CH$_2$)$_3$SiCH$_3$Cl$_2$, added as a fine stream over a period of 5 minutes. A vigorous evolution of CO$_2$ resulted with considerable heat evolved. The resulting clear solution of

[HCl·NH$_2$(CH$_2$)$_3$SiCH$_3$O]$_x$ was neutralized with dilute sodium hydroxide to produce quantitatively, a clear water solution of

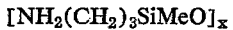
[NH$_2$(CH$_2$)$_3$SiMeO]$_x$

Hydrolysis studies of dilute aqueous solutions of $\gamma$-OCN(CH$_2$)$_3$Si(OCH$_3$)$_3$ have indicated that in the absence of strong acid or base a water soluble hydrolyzate with both amino and disubstituted urea functionality was produced. In the presence of excess HCl the amine hydrochloride derivative was obtained quantitatively in the hydrolyzate. With excess sodium hydroxide a quantitative generation of primary amino groups was obtained in the hydrolyzate.

Treatment of glass fiber with aqueous solutions of

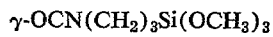
$\gamma$-OCN(CH$_2$)$_3$Si(OCH$_3$)$_3$ has produced a significant improvement in the wet and dry tensile properties of reinforced thermoplastic laminates, notably with polyvinyl chloride. Hydrolysis studies of dilute aqueous solutions of

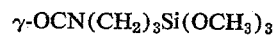
$\gamma$-OCN(CH$_2$)$_3$Si(OCH$_3$)$_3$ at room temperature have indicated that in the absence of strong acids or bases, a water soluble hydrolyzate with both amino and disubstituted urea functionality will be produced,

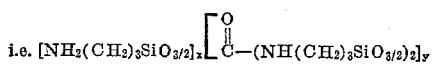
i.e. [NH$_2$(CH$_2$)$_3$SiO$_{3/2}$]$_x$[Ö—(NH(CH$_2$)$_3$SiO$_{3/2}$)$_2$]$_y$ (where $x+y=100$ mole-percent). Thus, a 2 weight percent solution of $\gamma$-OCN(CH$_2$)$_3$Si(OCH$_3$)$_3$ in distilled water titrated for 26 mole-percent of free —NH$_2$ group after 75 minutes and showed no further change in titer with time.

The reaction path followed in the neutral hydroysis of aliphatic isocyanate with a large excess of water is generally believed to be:

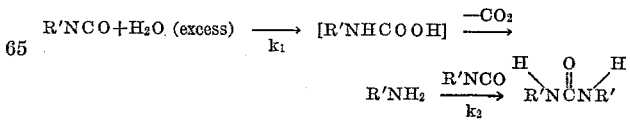

The amounts of amine and urea will be determined by the relative speed of $k_1$ and $k_2$ which in turn are related to the steric and inductive effect of the R group. Higher water dilutions obviously favor the formation of more free amine.

The reaction of $\gamma$-OCN(CH$_2$)$_3$Si(OMe)$_3$ has proceeded differently in the presence of strong acid or base.

Thus, in the presence of two equivalents of HCl a quantitative yield of amine hydrochloride was obtained:

γ-OCN(CH₂)₃Si(OCH₃)₃+H₂O (excess)+2HCl ⟶
[HCl.NH₂(CH₂)₃SiO₃/₂]ₓ+CO₂+HCl+3CH₃OH

With a strong base the free amine and carbonate were formed. Thus, in the presence of two equivalents of sodium hydroxide, a quantitative yield of γ-aminopropyl-silicone was formed:

γ-OCN(CH₂)₃Si(OCH₃)₃+H₂O (excess)+2NaOH ⟶
[γ-NH₂(CH₂)₃SiO₃/₂]ₓ+Na₂CO₃+3CH₃OH

What is claimed is:
1. The novel isocyanato silane of the formula

$$O=C=NCH_2CH_2CH_2\underset{\underset{X_{3-n}}{|}}{Si}(CH_3)_n$$

wherein X is halogen and n is 0, 1 or 2.
2. The silane of claim 1 wherein n is 0 and X is chlorine.
3. The silane of claim 1 wherein n is 1 and X is chlorine.
4. The process of making silanes of the formula $$O=C=NCH_2CH_2CH_2\underset{\underset{X_{3-n}}{|}}{Si}(CH_3)_n$$

wherein X is halogen and n is 0, 1 or 2, which comprises reacting allyl isocyanate with $$HSi\underset{\underset{(CH_3)_n}{|}}{X_{3-n}}$$

in the presence of an addition catalyst.
5. The process of claim 4 wherein the catalyst is a platinum catalyst.

References Cited

UNITED STATES PATENTS 3,012,006  12/1961  Holbrook et al.
3,170,891  2/1965   Speier.
3,178,391  4/1965   Holtschmidt et al.

OTHER REFERENCES

Day et al., "Organic Chemistry," D. Van Nostrand Co., Inc., N.Y. (1960), p. 517.

Wagner et al., "Synthetic Organic Chemistry," John Wiley and Sons, Inc., N.Y. (1953), p. 674.

TOBIAS E. LEVOW, Primary Examiner

P. F. SHAVER, Assistant Examiner

U.S. Cl. X.R.

260—824, 858; 106—287